United States Patent
Lee et al.

(10) Patent No.: US 11,089,589 B2
(45) Date of Patent: Aug. 10, 2021

(54) METHOD FOR TERMINAL TRANSMITTING SIGNALS FOR V2X COMMUNICATION IN WIRELESS COMMUNICATION SYSTEM AND TERMINAL USING THE METHOD

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/609,172

(22) PCT Filed: Apr. 30, 2018

(86) PCT No.: PCT/KR2018/004993
§ 371 (c)(1),
(2) Date: Oct. 28, 2019

(87) PCT Pub. No.: WO2018/199707
PCT Pub. Date: Nov. 1, 2018

(65) Prior Publication Data
US 2020/0100230 A1 Mar. 26, 2020

Related U.S. Application Data

(60) Provisional application No. 62/491,275, filed on Apr. 28, 2017, provisional application No. 62/505,897, filed on May 13, 2017.

(51) Int. Cl.
*H04W 72/04* (2009.01)
*H04L 1/00* (2006.01)
*H04L 5/26* (2006.01)

(52) U.S. Cl.
CPC ......... *H04W 72/044* (2013.01); *H04L 1/0079* (2013.01); *H04L 5/26* (2013.01); *H04W 72/048* (2013.01)

(58) Field of Classification Search
None
See application file for complete search history.

(56) References Cited

FOREIGN PATENT DOCUMENTS

| WO | WO2017018758 | 2/2017 |
| WO | WO2017053637 | 3/2017 |

OTHER PUBLICATIONS

NTT DOCOMO, INC., "On support of short TTI for V2x PC5 operations," R1-1705697, 3GPP TSG RAN WG1 Meeting #88bis, Spokane, USA, Apr. 3-7, 2017, 5 pages.
(Continued)

*Primary Examiner* — James P Duffy
(74) *Attorney, Agent, or Firm* — Fish & Richardson P.C.

(57) ABSTRACT

Provided are a method for a first terminal transmitting signals for V2X communication in a wireless communication system and a terminal using the method. The method comprises: mapping V2X data in a first resource area including an N (N is a natural number) number of symbols in a time dimension; and transmitting the V2X data which has been mapped, wherein when an M (M is a natural number smaller than N) number of symbols are included in the time dimension and a second terminal transmits a signal in a frequency division-multiplexed second area to the first resource area, resource elements in the first resource area in an error symbol are excluded from the mapping step, wherein the error symbol is positioned immediately after the M number of symbols in the first resource area.

4 Claims, 12 Drawing Sheets

(56) References Cited

OTHER PUBLICATIONS

Intel Corporation, "Considerations on Support of Short TTI for LTE V2V Sidelink Communication," R1-1704688, 3GPP TSG RAN1 WG Meeting #88bis, Spokane, USA, Apr. 3-7, 2017, 12 pages.
ZTE, ZTE Microelectronics, "Discussion on Short TTI with eV2X," R1-1704655, 3GPP TSG RAN WG1 Meeting #88bis, Spokane, Washington, USA, Apr. 3-7, 2017, 7 pages.
EP Supplementary Search Report in European Application No. EP 18789846, dated Feb. 12, 2020, 11 pages.
Huawei, HiSilicon, "Discussion on supporting short TTI for R15 sidelink", R1-1704279, 3GPP TSG RAN WG1 Meeting #88b, Spokane, USA, Apr. 3-7, 2017, 2 pages.

FIG. 5
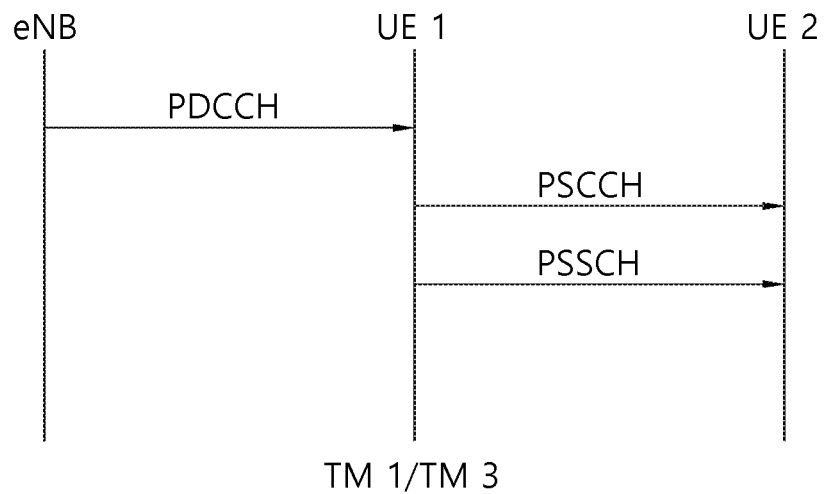
(a)
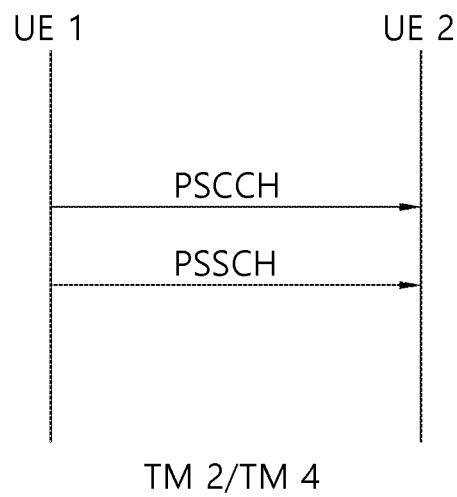
(b)

METHOD FOR TERMINAL TRANSMITTING SIGNALS FOR V2X COMMUNICATION IN WIRELESS COMMUNICATION SYSTEM AND TERMINAL USING THE METHOD

CROSS-REFERENCE TO RELATED APPLICATIONS

This application is a National Stage application under 35 U.S.C. § 371 of International Application No. PCT/KR2018/004993, filed on Apr. 30, 2018, which claims the benefit of U.S. Provisional Application Nos. 62/491,275 filed on Apr. 28, 2017, and 62/505,897 filed on May 13, 2017. The disclosures of the prior applications are incorporated by reference in their entirety.

BACKGROUND OF THE DISCLOSURE

Field of the disclosure

The present disclosure relates to wireless communication and, more particularly, to a method for a terminal transmitting signals for V2X communication in a wireless communication system and a terminal using the method.

Related Art

Recently, interest in device-to-device (D2D) that is direct communication between devices has increased. Particularly, D2D attracts attention as a communication technology for public safety networks. Public safety networks have higher service requirements (reliability and security) than commercial communication networks and, particularly, require direct signal transmission and reception between devices, that is, D2D operation even when coverage of cellular communication is not reached or unavailable.

D2D operation has various advantages in terms of signal transmission and reception between neighboring devices. For example, a D2D UE can perform data communication with a high transfer rate and a low delay. Further, D2D operation can distribute traffic concentrated on a base station, and if a D2D UE serves as a relay, the D2D UE can also serve to extend the coverage of the base station.

Meanwhile, in Long Term Evolution-Advanced (LTE-A), an interface between UEs is referred to as a sidelink and a sidelink can also be used for communication between UEs installed in vehicles or between a UE installed in a vehicle and another UE, that is, vehicle-to-everything (V2X).

Meanwhile, in a future wireless communication system, a transmission time interval (TTI) which is shorter than the legacy TTI, for example, 1 ms, may be used. For the sake of convenience, the legacy TTI may be referred to as L-TTI, and a TTI shorter than the legacy TTI may be referred to as S-TTI.

A signal transmission scheme using the aforementioned S-TTI may be introduced for V2X communication. In this case, the same terminal may receive signal transmission using S-TTI and signal transmission using L-TTI, which are frequency division multiplexed (FDMed) in different adjacent frequency bands. Then, from the viewpoint of a receiving terminal, reception power is changed while a signal using the L-TTI is received, which requires time for additional automatic gain control (AGC) settling. The problem is that because of the additional time for AGC settling, a receiving terminal is unable to receive a signal using the L-TTI properly.

Taking into account the problem above, a method and an apparatus are needed, which transmit a V2X signal in a system where signal transmission using S-TTI and signal transmission using L-TTI are used together.

SUMMARY OF THE DISCLOSURE

An object of the present disclosure is to provide a method for a terminal to transmit signals for V2X communication in a wireless communication system and a terminal using the method.

In one aspect, provided is a method for a first UE transmitting signals for vehicle-to-everything (V2X) communication in a wireless communication system. The method includes mapping V2X data to a first resource area including N symbols (where N is a natural number) in a time domain and transmitting the mapped V2X data. When a second UE transmits a signal in a second resource area which includes M (where M is a natural number smaller than N) symbols in the time domain and is frequency division multiplexed (FDMed) to the first resource area, resource elements in an error symbol of the first resource area are excluded from the mapping step, and the error symbol is positioned immediately after the M symbols in the first resource area.

The first resource area may include 14 symbols, and the second resource area includes 7 symbols in the time domain.

An RX UE receiving signals from the first and second UEs may use the error symbol for the purpose of automatic gain control (AGC) for signal reception after the M-th symbol of the first resource area.

Additional V2X data may be transmitted through the error symbol only when automatic gain control time of the RX UE is less than a specific value.

The additional V2X data may be transmitted through odd-numbered or even-numbered sub carriers in the error symbol.

Transport block size (TBS) of a transport block transmitted in the first resource area may be determined based on the number of effective resources calculated by excluding the error symbol in the first resource area.

In another aspect, provided is a method for a UE transmitting signals for V2X communication in a wireless communication system. The method includes transmitting first V2X data by using a first transmission time interval (TTI) including N symbols (where N is a natural number) in a time domain and transmitting second V2X data by using a second TTI including M symbols (where M is a natural number smaller than N) in the time domain. The first V2X data transmission and the second V2X data transmission are performed at different times.

The first TTI may include 14 symbols, and the second TTI may include 7 symbols.

The method may further include decoding sidelink control information transmitted through a Physical Sidelink Control Channel (PSCCH) from other UE. The sidelink control information may indicate a resource area to which the other UE transmits third V2X data by using the first TTI, and the UE may perform the second V2X data transmission in such a way not to overlap the resource area in the time domain.

In still another aspect, provided is a User Equipment (UE). The UE includes a transceiver transmitting and receiving radio signals and a processor operating in conjunction with the transceiver. The processor is configured to map V2X data to a first resource area including N symbols (where N is a natural number) in a time domain and transmit the mapped V2X data. When an another UE transmits a signal in a second resource area which includes M (where M is a natural number smaller than N) symbols in the time domain and is frequency division multiplexed (FDMed) to the first resource area, resource elements in an error symbol of the first resource area are excluded from the mapping step, and the error symbol is positioned immediately after the M symbols in the first resource area.

According to the present disclosure, in a system where L-TTI transmission (TX) using the legacy TTI and S-TTI TX using a TTI shorter than the legacy TTI are used together, a terminal attempting L-TTI TX may perform transmission after mapping data for L-TTI TX by taking into account the symbols used for AGC required additionally from the viewpoint of a receiving terminal. For example, a receiving terminal may exclude resource elements in a symbol used additionally for AGC and so perform rate matching. As a result, the receiving terminal is enabled to receive both the L-TTI TX and the S-TTI TX without error.

BRIEF DESCRIPTION OF THE DRAWINGS

FIG. 5 illustrates a UE operation according to transmission mode (TM) related to V2X/D2D.

DESCRIPTION OF EXEMPLARY EMBODIMENTS

Figure 1:
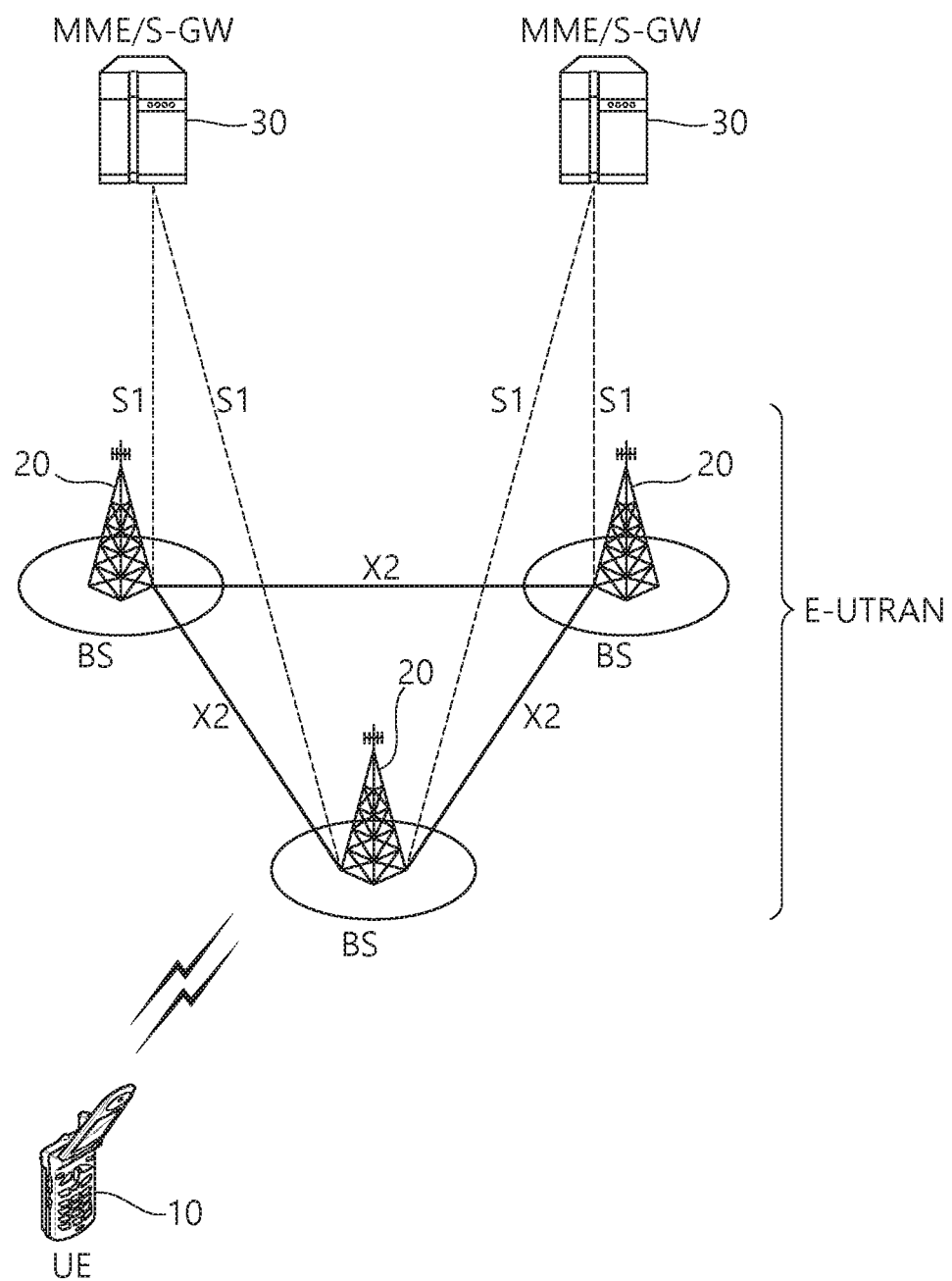
FIG. 1 illustrates a wireless communication system.

FIG. 1 shows a wireless communication system.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a time division duplex (TDD) system, a frequency division duplex (FDD) system, or a system in which TDD and FDD are used together.

Figure 2:
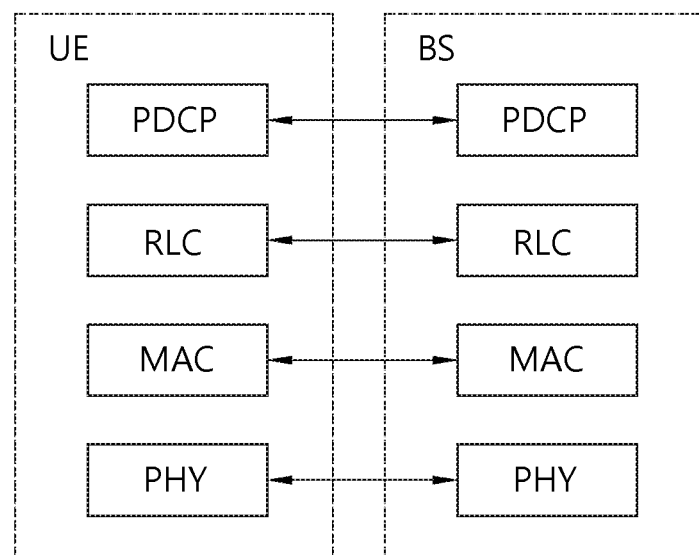
FIG. 2 is a block diagram showing the structure of a radio protocol on the user plane.
Figure 3:
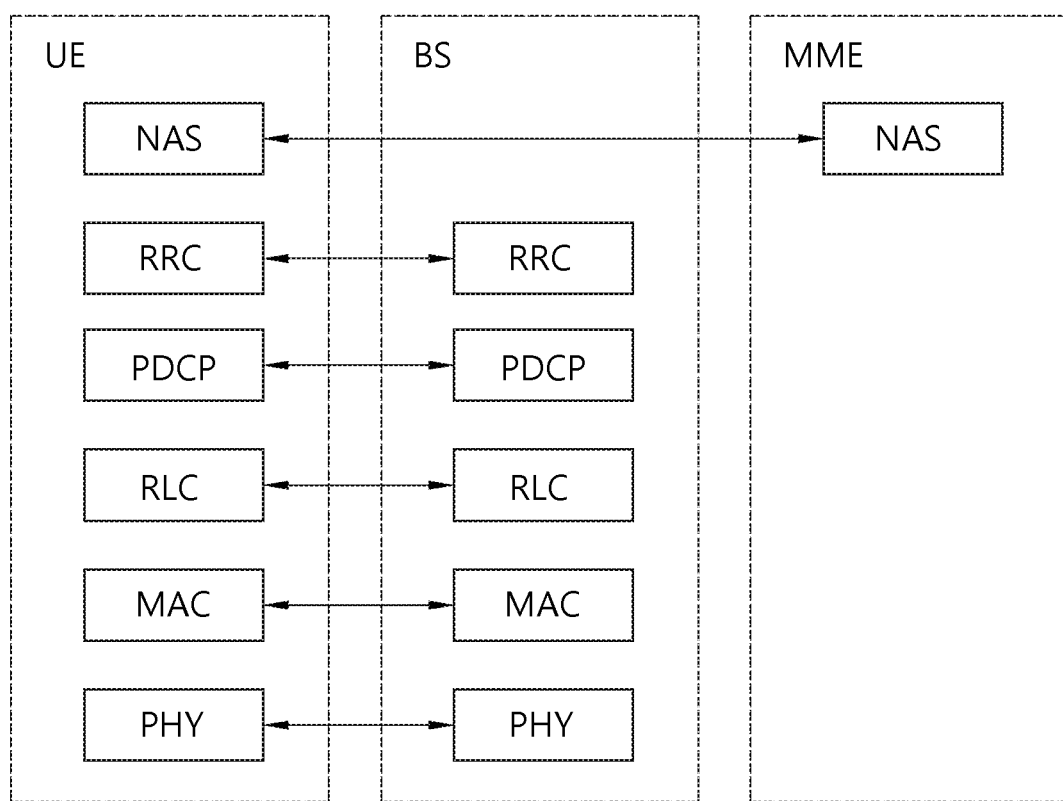
FIG. 3 is a block diagram showing the structure of a radio protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

An RRC state refers to whether an RRC layer of a UE is logically connected to an RRC layer of E-UTRAN, a state in which they are connected to each other is referred to as an RRC connected state RRC CONNECTED, and a state in which they are not connected to each other is referred to as an RRC idle state RRC IDLE. A UE in an RRC connected state has RRC connection and thus E-UTRAN can detect presence of the UE per cell and can effectively control the UE. On the other hand, a UE in an RRC idle state cannot be detected by E-UTRAN and is managed by a core network (CN) per tracking area that is a larger area unit than a cell. That is, only presence or absence of a UE in an RRC idle state is detected per large area and the UE needs to switch to an RRC connected state in order to receive mobile communication services such as audio and data services.

When a user initially powers on a UE, the UE searches for an appropriate cell first and then remains in the cell in an RRC idle state. The UE in the RRC idle state establishes RRC connection with E-UTRAN through an RRC connection procedure and switches to an RRC connected state when RRC connection needs to be established. Cases in which a UE in an RRC idle state needs to establish RRC connection include, for example, a case in which uplink data transmission is required due to a user's attempt to call, a case in which, when a paging message is received from E-UTRAN, a response message to the paging message is transmitted, and the like.

A non-access stratum (NAS) layer higher than the RRC layer executes functions such as session management and mobility management.

To manage UE mobility in the NAS layer, two states of EMM-REGISTERED (EPS Mobility Management-REGISTERED) and EMM-DEREGISTERED are defined and these two states are applied to a UE and an MME. The UE is initially in the EMM-DEREGISTERED state and performs a procedure of registering with a network through an initial attach procedure to access the network. When the attach procedure has been successfully performed, the UE and the MME become the EMM-REGISTERED state.

To manage signaling connection between a UE and an EPC, two states of ECM (EPS Connection Management)-IDLE and ECM-CONNECTED are defined and these two states are applied to the UE and MME. When an UE in an ECM-IDLE state establishes RRC connection with E-UTRAN, the UE switches to an ECM-CONNECTED state. An MME in an ECM-IDLE state switches to an ECM-CONNECTED state when the MME establishes S1 connection with E-UTRAN. When the UE is in the ECM-IDLE state, E-UTRAN does not have context information of the UE. Accordingly, the UE in the ECM-IDLE state performs a UE based mobility related procedure such as cell selection or cell reselection without the need to receive a command from a network. On the other hand, when the UE is in the ECM-CONNECTED state, mobility of the UE is managed by a command from the network. When the position of the UE changes to a position different from that known to the network in the ECM-IDLE state, the UE notifies the network of the corresponding position through a tracking area update procedure.

Hereinafter, D2D operation will be described. In 3GPP LTE-A, services related to D2D operation are called proximity based services (ProSe). Hereinafter, ProSe is the concept equivalent to D2D operation and can be interchangeably used with D2D operation. Hereinafter, ProSe will be described.

ProSe includes ProSe direct communication and ProSe direct discovery. ProSe direct communication refers to communication performed between two or more neighboring UEs. The UEs can perform communication using a user plane protocol. A ProSe-enabled UE refers to a UE supporting procedures related to ProSe requirements. The ProSe-enabled UE include both a public safety UE and a non-public safety UE unless otherwise mentioned. The public safety UE is a UE that supports both functions specialized for public safety and a ProSe process and the non-public safety UE is a UE that supports the ProSe process but does not support the functions specialized for public safety.

ProSe direct discovery is a process for discovering a ProSe-enabled UE. Here, only capability of the aforementioned two ProSe-enabled UEs. EPC-level ProSe discovery refers to a process in which an EPC determines whether two ProSe-enabled UEs are in proximity to each other and notify the two ProSe-enabled UEs of the proximity thereof.

Hereinafter, ProSe direct communication may be referred to as D2D communication and ProSe direct discovery may be referred to as D2D discovery. A link used for D2D operation is referred to as a sidelink in LTE.

Now, V2X communication is described. V2X refers to communication between a UE installed in a vehicle and another UE. The other UE may be a pedestrian, a vehicle, or infrastructure. In this case, V2X may be respectively referred to as V2P (vehicle to pedestrian), V2V (vehicle to vehicle) and V2I (vehicle to infrastructure).

V2X communication can transmit and receive data/control information through a sidelink defined in D2D operation instead of uplink/downlink between a base station and a UE used in LTE.

The following physical channels can be defined for the sidelink.

PSBCH is a physical sidelink broadcast channel. PSCCH is a physical sidelink control channel. PSDCH is a physical sidelink discovery channel. PSSCH is a physical sidelink shared channel. SLSS is a sidelink synchronization signal. SLSS may include a PSSS (Primary Sidelink Synchronization Signal) and an SSSS (Secondary Sidelink Synchronization Signal). The SLSS and the PSBCH can be transmitted together.

The sidelink can refer to an interface between UEs and can correspond to PC5 interface.

Figure 4:
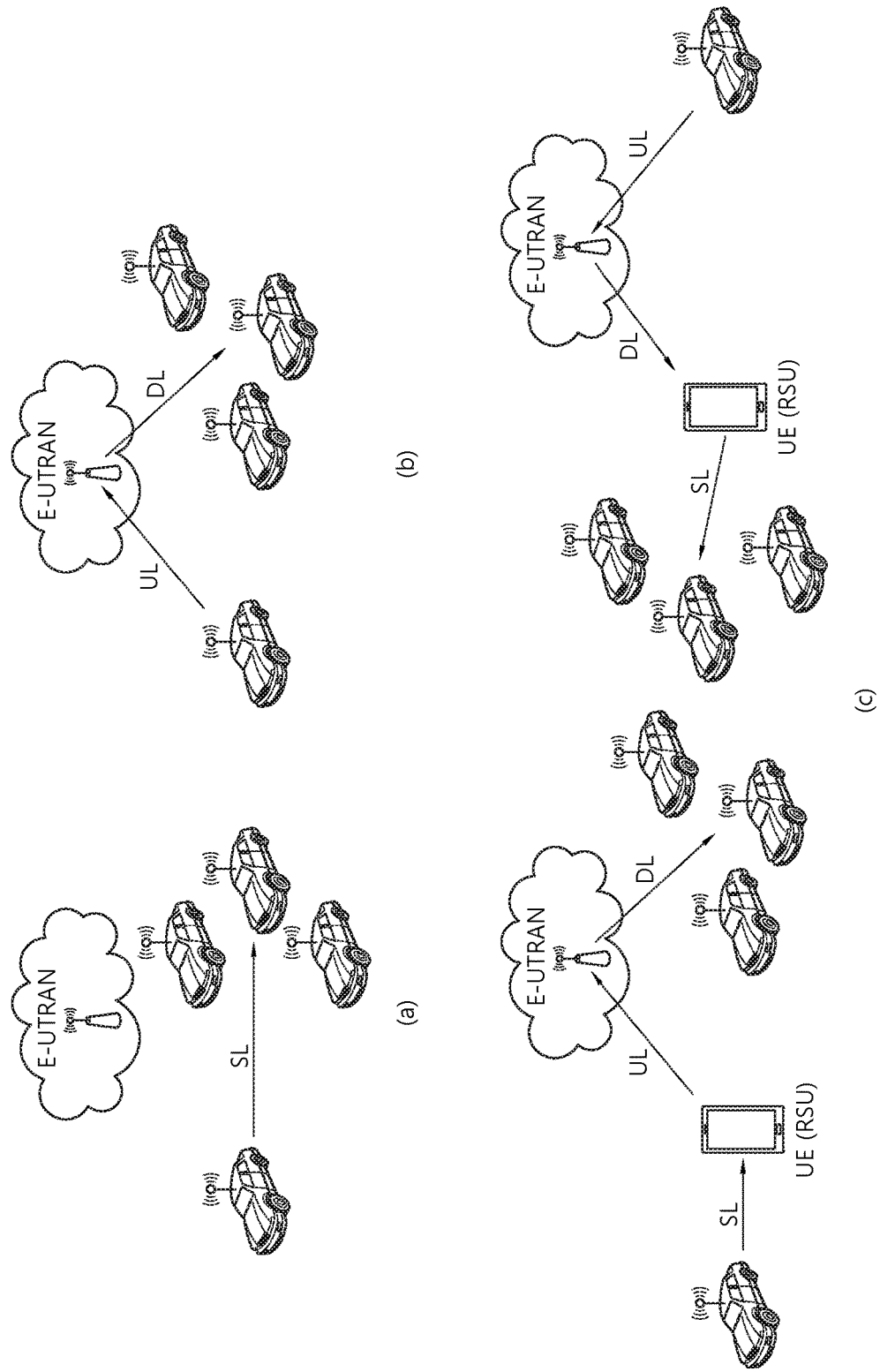
FIG. 4 illustrates scenarios for V2X communication.

FIG. 4 illustrates scenarios for V2X communication.

Referring to FIG. 4(a), V2X communication may support an information exchange operation (between UEs) based on the (sidelink) PC5 interface between UEs, and as shown in FIG. 4(b), V2X communication may support an information exchange operation (between UEs) based on the Uu interface between an eNodeB and a UE. Also, as shown in FIG. 4(c), V2X communication may support an information exchange operation (between UEs) by using both of the PC5 and Uu interfaces.

FIG. 5 illustrates a UE operation according to transmission mode (TM) related to V2X/D2D.

FIG. 5(a) illustrates the transmission mode 1 and 3; and FIG. 5(b) illustrates the transmission mode 2 and 4. In the transmission mode 1/3, an eNB performs resource scheduling for UE 1 through a PDCCH (more specifically, DCI), and UE 1 performs D2D/V2X communication with UE 2 according to the corresponding resource scheduling. After transmitting sidelink control information (SCI) to the UE 2 through a Physical Sidelink Control Channel (PSCCH), UE 1 may transmit data based on the SCI through a Physical Sidelink Shared Channel (PSSCH). The transmission mode 1 may be applied for D2D communication, and transmission mode 3 may be applied for V2X communication.

The transmission mode 2/4 may be considered to be the mode in which a UE performs scheduling by itself. More specifically, the transmission mode 2 may be applied for D2D communication, and a UE may select a resource by itself within a configured resource pool to perform the D2D operation. The transmission mode 4 may be applied for V2X communication, and a UE may perform the V2X operation after selecting a resource by itself within a selection window after conducting a sensing/SA decoding process and so on. After transmitting the SCI to UE 2 through the PSCCH, UE 1 may transmit data based on the SCI through the PSSCH. In what follows, the transmission mode may be abbreviated to mode.

While the control information that an eNB transmits to a UE through a PDCCH is called downlink control information (DCI), the control information transmitted by a UE to another UE through a PSCCH may be called SCI. SCI may transfer sidelink scheduling information. SCI may be implemented in various formats; for example, SCI format 0 and SCI format 1 may be used.

The SCI format 0 may be used for scheduling of a PSSCH. The SCI format 0 may include a frequency hopping flag (1 bit), resource block allocation and hopping resource allocation field (the number of bits of which may differ according to the number of resource blocks of a sidelink), time resource pattern (7 bits), modulation and coding scheme (5 bits), time advance indication (11 bits), and group destination ID (8 bits).

The SCI format 1 may be used for scheduling of a PSSCH. The SCI format 1 includes priority (3 bits), resource reservation (4 bits), frequency resource position of initial transmission and retransmission (the number of bits of which may differ according to the number of subchannels of a side link), time gap between initial transmission and retransmission (4 bits), MCS (5 bits), retransmission index (1 bit), and reserved information bits. Hereinafter, the reserved information bit may be called reserved bit for short. The reserved bits may be added until the bit size of the SCI format 1 becomes 32 bits. In other words, the SCI format 1 includes a plurality of fields carrying different information, the remaining bits excluding the total number of bits of the plurality of fields from the fixed total number of bits (32 bits) may be called reserved bits.

The SCI format 0 may be used for transmission mode 1 and 2; and the SCI format 1 may be used for transmission mode 3 and 4.

In what follows, for the convenience of descriptions, the present disclosure will be described based on the 3GPP LTE/LTE-A system. However, the scope of the system to which the present disclosure is applied may be extended to other systems in addition to the 3GPP LTE/LTE-A system.

S-RSSI (Sidelink Received Signal Strength Indicator), S-RSRP (Sidelink Reference Signal Received Power), CBR (Channel busy ratio) and CR (Channel occupancy ratio) will be described.

First, S-RSSI is a received signal strength indicator on sidelink. S-RSSI can be defined as a linear average of total received power for each SC-FDMA symbol, observed by a UE in a set subchannel, in SC-FDMA symbols #1, 2, . . . , 6 of the first slot of a subframe and SC-FDMA symbols #0, 1, . . . , 5 of the second slot.

S-RSRP refers to reference signal receive power on sidelink. S-RSRP may include, for example, PSSCH-RSRP for which RSRP is calculated in PSSCH. PSSCH-RSRP can be defined as a linear average of power contributions of resource elements (REs) carrying a DM-RS related to the PSSCH in a physical resource block (PRB) indicated by the related PSSCH.

CBR represents a channel busy ratio and CBR measured in subframe n can be defined as follows.

In the case of a PSSCH, CBR is sensed in subframes [n−100, n−1] and represents a ratio in a resource pool of a subchannel having S-RSSI measured to exceed a predetermined or set threshold value.

In the case of a PSCCH, CBR is sensed in subframes [n−100, n−1] and represents a ratio of resources of a PSCCH pool having S-RSSI measured to exceed a predetermined or set threshold value in a pool set such that the PSCCH is transmitted along with the corresponding PSSCH in resources blocks which are not consecutive. Here, it is assumed that the PSCCH pool is composed of resources having a size of two consecutive PRB pairs in the frequency domain.

CR refers to a channel occupancy rate. CR calculated in subframe n can be defined as a value obtained by dividing the sum of the number of subchannels used for transmission thereof in subframes [n−a, n−1] and the number of subchannels permitted for transmission thereof in subframes [n, n+b] by the number of subchannels configured in a transmission pool over subframes [n−a, n+b].

Here, a is a positive integer and b is 0 or a positive integer. a and b are determined by a UE, a+b+1=1000, a is equal to or greater than 500, and n+b needs not to exceed the latest transmission opportunity of a grant for current transmission. Cr can be evaluated for each (re)transmission.

In what follows, the present disclosure will be described.

The proposed methods in the following describe a method for efficiently supporting an operating scenario in which V2X message transmission based on S-TTI, which implies a relatively short transmission time interval compared with the legacy time interval (for example, 1 ms), and V2X message transmission based on a relatively long TTI (for example, 1 ms) are received (or transmitted) according to the frequency division multiplexing (FDM) scheme.

The V2X communication mode typically includes a mode (A) in which an eNB signals (or controls) scheduling information related to V2X message TX (or RX) on a V2X resource pool preconfigured (or signaled) from the eNB (or network), which is referred to as mode #3. For example, the mode #3 may be intended primarily for a UE located inside the communication coverage of an eNB and/or a UE in the RRC_CONNECTED state.

Also, the V2X communication mode provides a mode (B) in which a UE (independently) determines (or controls) scheduling information related to V2X message TX (or RX) on a V2X resource pool preconfigured (or signaled) from the eNB (or network), which is referred to as mode #4. The mode #4 may be intended primarily for a UE located inside or outside the communication coverage of an eNB and/or a UE in the RRC_CONNECTED or RRC_IDLE state. The mode #3 and #4 have already been described with reference to FIG. 5.

In what follows, a "sensing operation" may be interpreted as a PSSCH-RSRP measurement operation based on a DM-RS sequence of a PSSCH scheduled by a PSCCH which has succeeded in decoding and/or S-RSSI measurement operation based on a sub-channel related to V2X resource pool.

In the present disclosure, "reception" may be extended to be interpreted as at least one of (A) decoding (or reception) operation of a V2X channel (or signal) (for example, PSCCH, PSSCH, PSBCH, PSSS/SSSS) and/or decoding (or reception) operation of a WAN DL channel (or signal) (for example, PDCCH, PDSCH, PSS/SSS) and/or (B) sensing operation and/or (C) CBR measurement operation.

In the present disclosure, "transmission" may be extended to be interpreted as a transmission operation of a V2X channel (or signal) (for example, PSCCH, PSSCH, PSBCH, PSSS/SSSS) and/or transmission operation of a WAN UL channel (or signal) (for example, PUSCH, PUCCH, SRS).

In the present disclosure, a "carrier" may be extended to be interpreted as (A) a preconfigured (or signaled) carrier set (or group) and/or (B) V2X resource pool (set or group) and/or (time or frequency) resource (set or group) (on the carrier).

In the present disclosure, a "synchronization signal" may be extended to be interpreted to include not only "SLSS" but also "PSBCH".

In what follows, L-TTI may indicate an operation based on TTI with the conventional length of 1 ms or an operation based on a larger number of symbols than S-TTI. L-TTI TX/RX may indicate L-TTI based transmission or reception of a channel or a signal. S-TTI may indicate an operation based on a smaller number of symbols than L-TTI. S-TTI TX/RX may indicate S-TTI based transmission or reception of a channel or a signal. S-PSCCH and S-PSSCH may indicate an S-TTI based PSCCH and PSSCH, respectively. L-PSCCH and L-PSSCH may indicate an L-TTI based PSCCH and PSSCH, respectively.

In a future wireless communication system, taking into account traffic (or data) with various transmission coverage/reliability/latency requirements, adaptive TTI (channel or signal) may be introduced. As one example, after a basic resource unit may be defined (or configured) in advance, a TTI (for transmission of a channel or signal related to data with a specific requirement) may be defined as a single basic resource unit or a combination of multiple basic resource units. As one example, if S-TTI is defined as a preconfigured (or signaled) basic resource unit, L-TTI may be interpreted as a combination of (preconfigured or signaled) K S-TTIs (basic resource units). As another example, if L-TTI is defined as a preconfigured (or signaled) basic resource unit, S-TTI may be interpreted as one of (preconfigured or signaled) K segmentations from L-TTI (basic resource unit) (for example, a kind of mini-basic resource units). As yet another example, S-TTI may also be implemented as a combination of a plurality of (preconfigured or signaled) basic resource units.

From the viewpoint of a V2X reception (RX) UE, if "L-TTI TX" and "S-TTI TX" are "FDM received" from other V2X TX UEs, (the whole) reception power is (partly) changed in the time domain, and thus additional AGC settling time (or symbol) may be required. The "V2X RX UE" may be interpreted (limitedly) as a UE that performs only the L-TTI RX (and/or S-TTI RX) operation.

Figure 6:
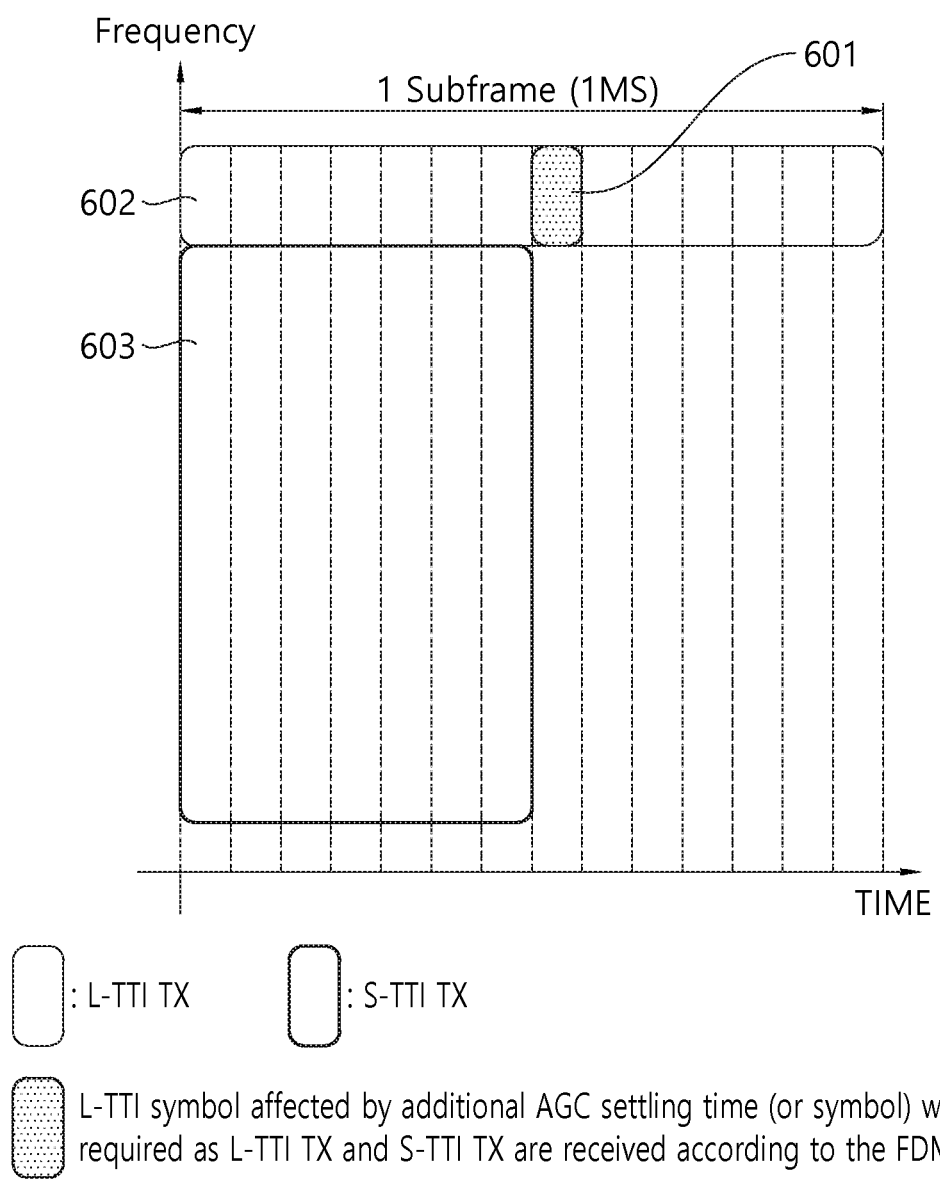
FIG. 6 illustrates a case where L-TTI and S-TTI are received according to the FDM scheme.

FIG. 6 illustrates a case where L-TTI and S-TTI are received according to the FDM scheme.

Referring to FIG. 6, a V2X RX UE may receive L-TTI TX from a first UE in the L-TTI TX area 602 and receive S-TTI TX from a second UE in the S-TTI TX area 603. In this case, the V2X RX UE may require additional AGC settling time (or symbol) 601. In FIG. 6, the eighth symbol 601 of the L-TTI is denoted as the additional AGC settling time (or symbol).

Since the V2X RX UE uses the eighth symbol 601 of the L-TTI for AGC settling, it may not receive the eighth symbol 601 properly. As a result, L-TTI RX performance may be degraded.

For the convenience of descriptions, hereinafter, the symbol 601 (of L-TTI) used for additional AGC settling will be referred to as "ER_symbol".

To solve the problem where L-TTI RX performance is reduced in a situation illustrated in FIG. 6, at least one of the following rules may be applied.

(Rule #A) When L-TTI TX is performed, a V2X TX UE may transmit a V2X message after rate matching by taking into account the remaining (data) valid symbols except for the ER_symbol.

Here, rate matching may refer to the process of mapping modulation symbols sequentially only to available resource elements (REs) excluding unavailable REs. Puncturing may refer to the process of not transmitting RE-related modulation symbols that may not actually be used in a transmitter or not receiving (or removing) RE-related modulation symbols that may not actually be used in a receiver after modulation symbols are mapped provided that all of the REs are available at first. In other words, while rate matching excludes resource elements that may not be used during a process of mapping data to resources, puncturing may refer to the process of performing the mapping step by including even the resource elements that may not be used but not actually transmitting a signal from the unavailable resource elements from the viewpoint of a TX UE or refer to the process of not receiving (or removing) the corresponding signal at the corresponding resource from the viewpoint of an RX UE.

Figure 7:
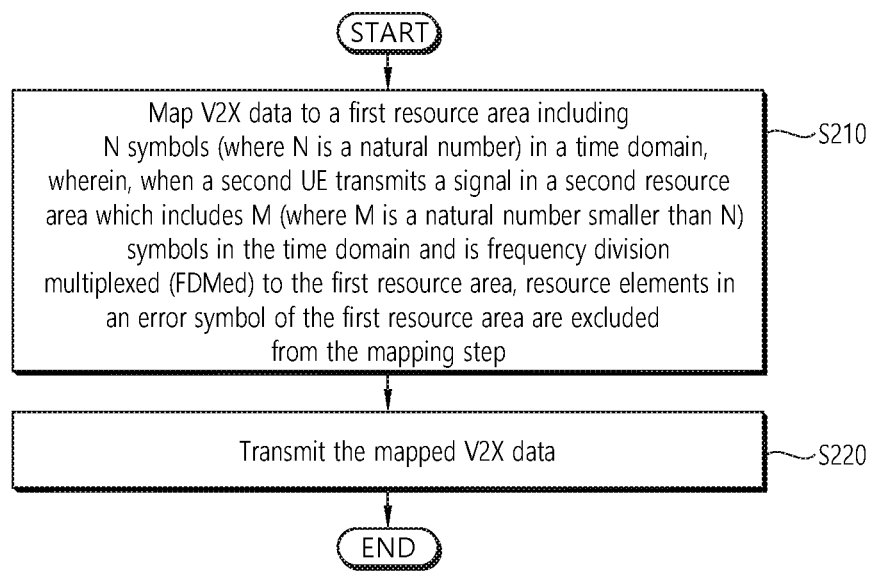
FIG. 7 illustrates one embodiment of the present disclosure according to rule #A.

FIG. 7 illustrates one embodiment of the present disclosure according to rule #A.

Referring to FIG. 7, a first UE maps V2X data to the first resource area including N (where N is a natural number) symbols in the time domain; in case a second UE transmits a signal in the second resource area which includes M (where M is a natural number smaller than N) in the time domain and is FDMed in the first resource area, those resource elements in the first resource area in the error symbol (ER_symbol) are excluded from the mapping step S210. In other words, rate matching may be performed in the first resource area by considering only the resource elements in the remaining valid symbols except for the resource elements in the error symbol (ER_symbol).

Afterwards, the first UE transmits the mapped V2X data S220.

To help understanding, referring again to FIG. 6, if the second UE transmits a signal in the S-TTI TX area 603 (the second resource area) FDMed with the L-TTI TX area 602 (the first resource area), the first UE maps V2X data to the remaining resource elements except for the resource elements in the error symbol 601 (ER_symbol) in the L-TTI TX area 602 and transmits the mapped V2X data. As described above, since the error symbol 601 (ER_symbol) is used by an RX UE for the purpose of AGC settling, the RX UE is unable to receive L-TTI TX properly at the error symbol 601 (ER_symbol). In other words, the RX UE that receives a signal from the first and second UEs may use the error symbol 601 (ER_symbol) for the purpose of AGC to receive a signal after the M-th symbol in the first resource area.

As one example, in the time domain, the first resource area may include 14 symbols, and the second resource area may include 7 symbols.

Figure 8:
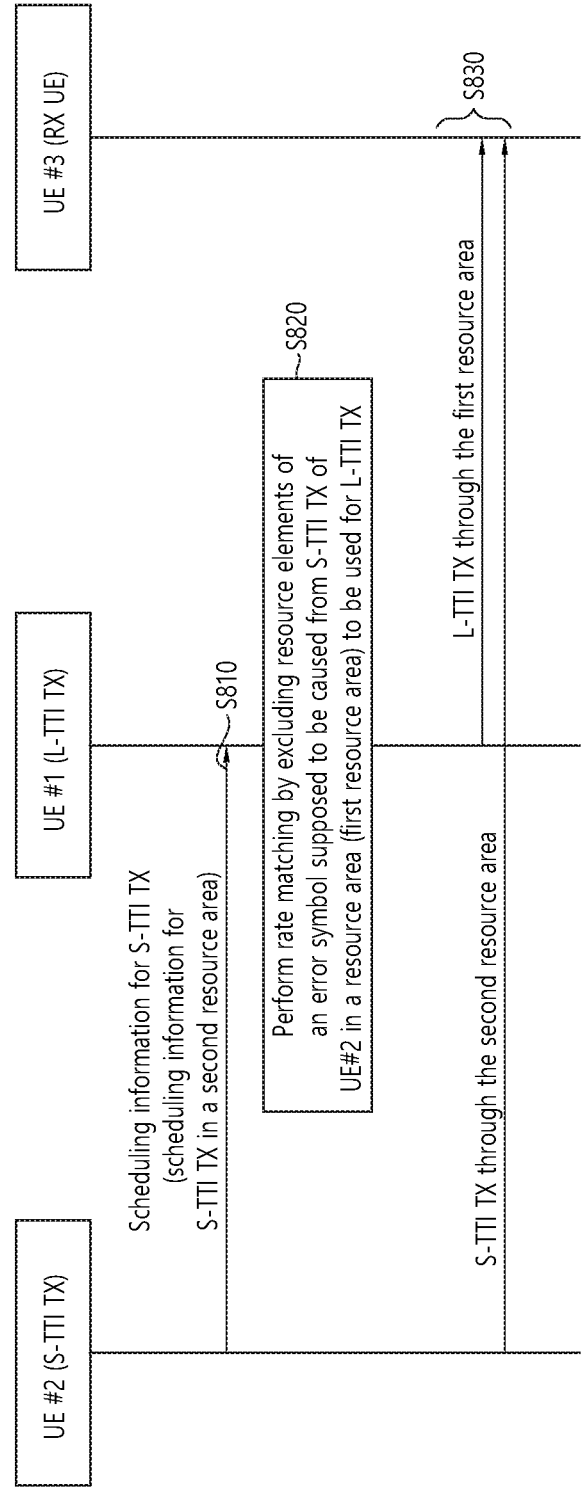
FIG. 8 illustrates a specific example to which the method of FIG. 7 is applied.

FIG. 8 illustrates a specific example to which the method of FIG. 7 is applied.

Referring to FIG. 8, UE #1 may be a UE attempting to perform L-TTI TX, UE #2 may be a UE attempting to perform S-TTI TX, UE #3 may be an RX UE that receives V2X data from UE #1 and #2.

In this case, UE #2 may transmit scheduling information about S-TTI TX (namely scheduling information about S-TTI TX in the second resource area) to neighboring UEs S810.

If UE #1 receives scheduling information about the S-TTI TX from UE #2, UE #1 performs rate matching excluding resource elements of the error symbol (ER_symbol) supposed to be caused from FDMed S-TTI TX of UE #2 in the resource area (first resource area) to be used for L-TTI TX S820. The first and second resource areas may correspond respectively to the L-TTI TX area 602 and S-TTI TX area 603 shown in FIG. 6.

Afterwards, UE #1 performs L-TTI TX to UE #3 through the first resource area, and UE #2 performs S-TTI TX to UE #3 through the second resource area S830.

Or, on the ER_symbol, (1) preconfigured (or signaled) dummy information may be mapped, or (2) information on the preconfigured (or signaled) X-th (data) valid symbol (of L-TTI TX) may be mapped repeatedly. For example, if the automatic gain control time of the RX UE may fall below a specific value, additional V2X data may be transmitted through the error symbol (ER_symbol). The additional V2X data may be transmitted from the error symbol (ER_symbol) through odd-numbered or even-numbered subcarriers.

(Rule #B) A V2X TX (or RX) UE may puncture ER_symbols at the time of performing L-TTI TX (or reception). As one example, when this rule is applied, the ER_symbol may be considered to be used only for the purpose of AGC settling.

(Rule #C) If (part of) the rule described above (for example, Rule #A or Rule #B) is applied, because of the loss due to the additional ER_symbol, the problem of increase of effective coding rate may be intensified (or occurred). In particular, in the case of a high modulation and coding scheme (for example, 64 QAM), the corresponding problem may become worse.

Therefore, actual transmission may be performed based on the value of "transport block size (TBS)" associated with (adjusted by) "effective PRB number", which has been (re)calculated in consideration of the ER_symbol loss. In other words, the transport block size (TBS) to be used for actual transmission may be recalculated in consideration of the ER_symbol loss, which may be referred to as "TB S adjustment".

For example, suppose TBS with a total of P bits is transmitted when K physical resource blocks (PRBs) and 64 QAM are applied. If TBS adjustment is applied, TBS with a total of W bits (where W<P), which is smaller than the P value, may be transmitted (to the corresponding K PRBs and 64 QAM).

As one example, given that the effective PRB number associated with the TBS of W bits is Z, the value of Z may be derived by multiplying the number of actually scheduled PRBs (namely K (>Z)) by a preconfigured (or signaled) value (hereinafter, it is denoted as "COEFF_VAL").

As one example, the "COEFF_VAL" value may be configured (or signaled) differently according to at least one of the number of ER_symbols, MCS value, UE speed, synchronization source type, and effective coding rate.

As one example, through a predefined channel (for example, by using reserved bits of a PSCCH), a V2X TX UE may signal (1) the effective PRB number (determined by the V2X TX UE itself) or "COEFF_VAL" value, or (2) $I_{TBS}$ value (where the UE derives an (associated) TBS value by combining the $I_{TBS}$ value and the number of (effective) PRBs ($N_{PRB}$)) to a V2X RX UE in association with TBS adjustment.

The following table is one example of a table that defines a transport block size (TBS) that may be transmitted according to the $I_{TBS}$ of a UE and the number of allocated (physical) resource blocks (RBs) ($N_{PRB}$).

TABLE 1

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |

In the Table 1, $I_{TBS}$ represents a TBS index given according to the MCS index ($I_{MCS}$). As shown in Table 1, the transport block size (TBS) may be defined according to the $I_{TBS}$ and MCS index ($I_{MCS}$). For example, if the number of allocated resource blocks is 10, and $I_{TBS}$ is 10, 1736 bits may be given to the TBS. However, it should be noted that Table 1 shows only a few examples for the sake of convenience, and TBS may also be defined for the case where the number of allocated resource blocks is larger than 10, and $I_{TBS}$ is also larger than 12.

Meanwhile, $I_{TBS}$ may be determined as follows according to the modulation order and MCS index ($I_{MCS}$).

Table 2 below shows a relationship between $I_{TBS}$ and MCS index ($I_{MCS}$).

TABLE 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In the present disclosure, a V2X TX UE may signal the effective PRB number determined or calculated in consideration of the ER_symbol or "COEFF_VAL" value or $I_{TBS}$ value to a V2X RX UE (through a predefined channel).

For example, TBS transmitted from the first resource area 602 of FIG. 6 may be determined according to the number of effective resource blocks (RBs) and $I_{TBS}$ value which take into account an error symbol, where the number of effective resource blocks may be obtained by multiplying the number of scheduled resource blocks by a predefined coefficient. Or, in determining the number of effective resource blocks included in the first resource area 602, the number of effective resource blocks may be determined in units of the legacy resource block size multiplied by a predefined coefficient rather than the legacy resource block size alone.

(Rule #D) If the AGC settling time may be reduced below a preconfigured (or signaled) threshold, data may be transmitted by using comb-type resource elements in an ER_symbol (in the frequency domain). For example, within the ER_symbol, data are mapped to odd-numbered subcarriers while NULL is mapped (or zero-power is mapped) to even-numbered subcarriers.

As described above, if data are transmitted in a comb-type (in the frequency domain), a (half) symbol is repeated along the time axis, and even if one (half) symbol is used for AGC settling, the other (half) symbol may remain effective.

(Rule #E) Phase discontinuity may occur (before or after the ER_symbol) during the L-TTI RX period due to execution of additional AGC settling. Taking into account the phase discontinuity, the following rules may be applied.

Channel estimation (and/or demodulation) may be performed independently for the area before or after the ER_symbol. A preconfigured (or signaled) number of DM-RSs or DM-RSs with a preconfigured (or signaled) pattern may be transmitted to the area before or after the ER_symbol, respectively.

The rules described above may be applied limitedly (1) only on a resource pool where S-TTI TX and L-TTI TX co-exist or both of them are allowed or applied limitedly (2) only when transmission power is maintained at a fixed level within L-TTI at the time of transmission of an L-TTI based specific channel or signal.

Whether to apply the rules (for example, whether to perform rate matching of a V2X message in consideration of the ER_symbol, whether to perform puncturing of the ER_symbol, whether to adjust TBS, whether to transmit data in the ER_symbol in the form of a comb-type (in the frequency domain), and whether channel estimation (and/or demodulation) independently in an area before or after the ER_symbol) is indicated (or required)) may be signaled from the network together with "resource pool configuration information" signaling or signaled by a V2X TX UE to a V2X RX UE through a predefined channel (for example, PSCCH).

The rule (for example, rule #C) may be extended in order to handle such a case where the problem of increasing effective coding rate is occurred (or intensified) as the first symbol (for example, the symbol intended for AGC settling) or the last symbol (for example, the symbol intended for TX or RX switching) is not effective (or not used).

In case "L-TTI TX" and "S-TTI TX" (from other V2X TX UEs) are "FDM transmitted (or received)", inter-carrier interference (ICI) occurs due to (power) transient period of S-TTI when a specific symbol of L-TTI (for example, the symbol at the same position with a symbol in the (power) transient period of S-TTI) is received. The rules may also be extended in order to handle the L-TTI symbol receiving the corresponding ICI (which, for example, may correspond to the aforementioned ER_symbol).

In case a specific V2X TX UE transmits L-TTI (for example, PSCCH) and S-TTI (for example, PSSCH) according to the FDM scheme, the total transmission power is (partly) changed on the time domain, and an additional (power) transient period is generated at a specific symbol on the L-TTI. The rules may also be extended to handle the corresponding distortion symbol (which, for example, may be interpreted as the aforementioned ER_symbol).

If S-TTI is configured (or signaled) with a length of "slot", the V2X TX UE that performs FDMed transmission of L-TTI or S-TTI may perform S-TTI TX (always) on the first or second slot (or on both of them) (with the same transmission power).

In particular, in case one transport block is transmitted twice with different redundancy versions (RVs), S-TTI TX may be performed on the first or second slot (with the same transmission power). Then an additional (power) transient period may be prevented from being occurred at least on the L-TTI.

In case an additional (power ON/OFF) transient period (for example, 20 microseconds) occurs due to FDM transmission of S-TTI, it is not possible to know which type of signal is transmitted in the corresponding period. In this case, a legacy UE is supposed to perform demodulation of L-TTI under an assumption that normal orthogonality is maintained (or operated), which may lead to degradation of L-TTI RX performance.

Also, even if a legacy UE performs transmission on a neighboring resource block of (L-TTI) TX (or S-TTI TX) that generates or includes an additional (power ON/OFF) transient period, inter-carrier interference may still be occurred when transmission of the corresponding legacy UE is received (for example, when transmission of the legacy UE is received at the same position with the symbol in which an (L-TTI or S-TTI) TX-related (power) transient period on a neighboring resource block exists). Therefore, a V2X TX UE performing S-TTI TX may apply the following rules. The "legacy TX (or RX)" may be extended to be interpreted as "L-TTI TX (or RX)".

(1) S-TTI TX may be performed together with L-TTI TX according to the TDM scheme. In other words, S-TTI TX may be performed on a different time resource rather than the time resource on which L-TTI TX is performed.

Figure 9:
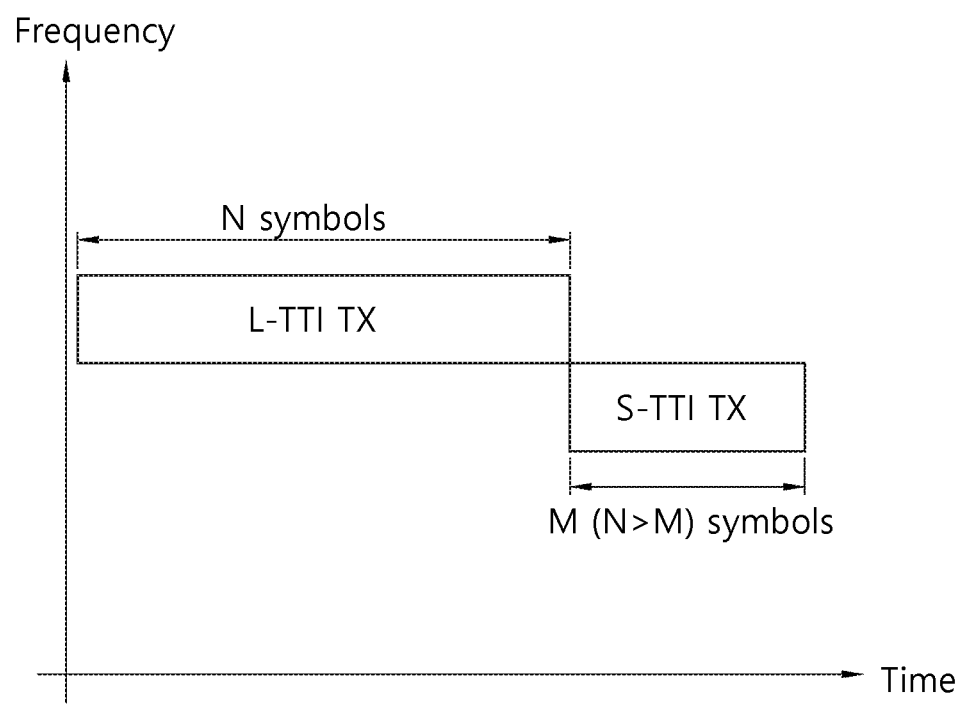
FIG. 9 illustrates one embodiment in which L-TTI TX and S-TTI TX are performed.

FIG. 9 illustrates one embodiment in which L-TTI TX and S-TTI TX are performed.

Referring to FIG. 9, a UE may perform L-TTI TX comprising N symbols and S-TTI TX comprising M symbols at different times (according to the TDM scheme).

At this time, the subjects that perform the L-TTI TX and the S-TTI TX may be the same V2X TX UE or different V2X TX UEs.

Figure 10:
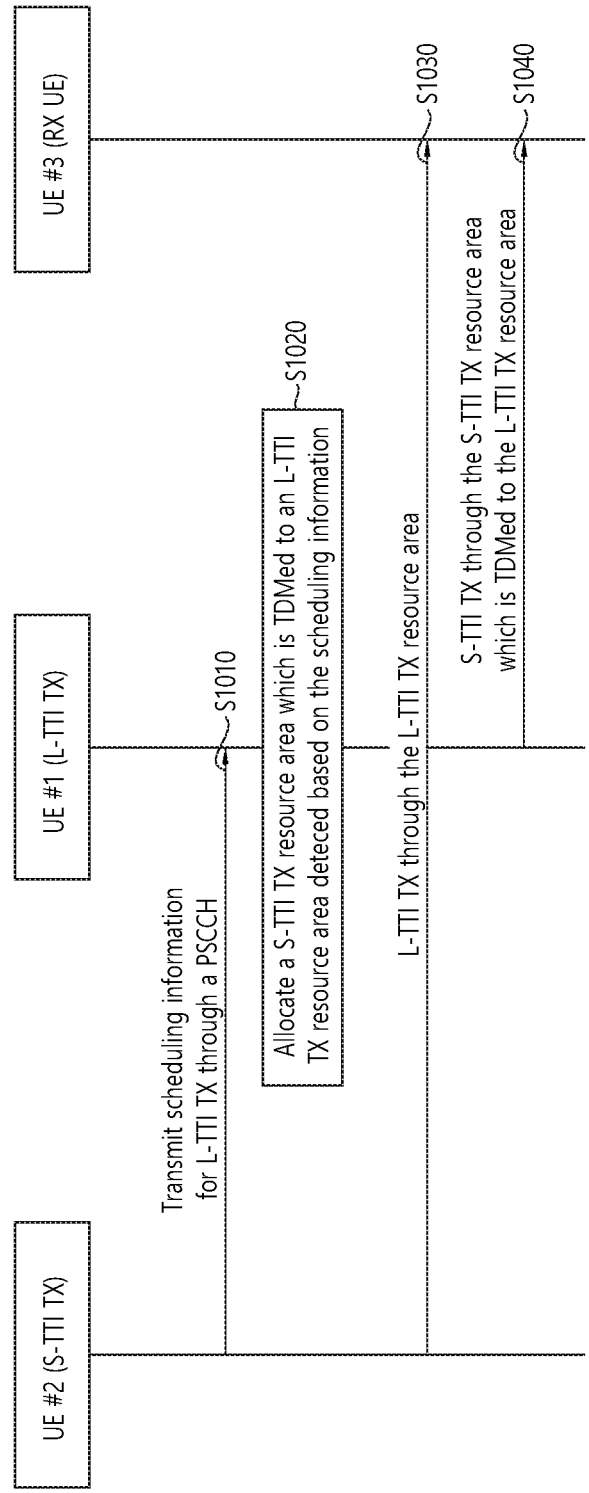
FIG. 10 illustrates an example of applying the method of FIG. 9 when the subjects performing L-TTI TX and S-TTI TX are different V2X TX UEs.

FIG. 10 illustrates an example of applying the method of FIG. 9 when the subjects performing L-TTI TX and S-TTI TX are different V2X TX UEs.

Referring to FIG. 10, UE #2 transmits scheduling information about L-TTI TX through a PSCCH S1010. If UE #1 receives the scheduling information, UE #1 allocates an S-TTI TX resource area which is TDMed to the L-TTI TX resource area detected based on the scheduling information S1020.

UE #2 performs L-TTI TX through the L-TTI TX resource area S1030, and UE #1 performs S-TTI TX through the S-TTI TX resource area which is TDMed to the L-TTI TX resource area S1040.

In other words, a V2X TX UE performing S-TTI TX detects L-TTI TX of other V2X TX UE through PSCCH decoding and based on the detection, performs S-TTI TX on a time resource different from the time resource on which the other V2X TX UE performs L-TTI TX.

(2) In case a legacy UE performs transmission on a neighboring resource block, S-TTI TX may be performed on different time resources, or only L-TTI TX may be performed on the same time resource.

A V2X TX UE may allocate (or use) the total transmission power (which is referred to as "FDM_TPOWER") allocated (or used) for the FDM TX period of L-TTI and S-TTI in the same way for the remaining L-TTI TX after the L-TTI or S-TTI FDM TX is completed. Then a specific symbol may be prevented from being used for (power) transient period generation or AGC settling.

If the rule described above is applied, transmission power of part of symbols may be changed during the L-TTI TX period. Therefore, to ensure channel estimation performance or QAM demodulation performance in part of the L-TTI period in which transmission power has been changed, a preconfigured (or signaled) number of DM-RSs or DM-RSs at preconfigured (or signaled) positions or with preconfigured (or signaled) shapes may be transmitted (additionally) over the corresponding period.

The amount of increase (or decrease) in transmission power over part of the L-TTI period may be signaled through a predefined channel (for example, PSCCH).

In the presence of L-TTI TX on an adjacent resource block, a UE performing S-TTI (PSCCH/PSSCH) transmission (for example, slot length) may perform S-TTI TX (always) on the first or second slot (or on both of them) (with the same transmission power). In particular, this method may be used when a transport block is transmitted twice with different RVs.

Since embodiments of the proposed method described above may be included as implementation methods of the present disclosure, it is obvious that the embodiments may be regarded as a kind of proposed methods. Also, although the proposed methods described above may be implemented independently, they may still be implemented in the form of a combination (merge) of part of the proposed methods.

Although the present disclosure describes the proposed methods based on the 3GPP LTE system for the convenience of descriptions, the scope of the system to which the proposed methods are applied may be extended to other systems in addition to the 3GPP LTE system. As one example, the proposed methods of the present disclosure may be extended to be applied for D2D communication. Here, D2D communication may indicate communication of a UE with another UE via a direct radio channel. Although a UE implies a user terminal, if network equipment such as an eNB transmits or receives a signal according to a communication scheme employed between UEs, the network equipment may also be regarded as a kind of UE.

Also, the proposed methods of the present disclosure may be applied limitedly only to the mode 3 V2X operation (and/or mode 4 V2X operation).

Also, the proposed methods of the present disclosure may be applied limitedly only to preconfigured (or signaled) (specific) V2X channel (or signal) transmission (for example, PSSCH (and/or (associated) PSCCH and/or PSBCH)).

Also, the proposed methods of the present disclosure may be applied limitedly only to the case where a PSCCH associated with a PSSCH is transmitted in adjacency to the PSSCH (or in non-adjacency to the PSSCH) in the frequency domain and/or transmission is performed based on a preconfigured (or signaled) MCS (and/or coding rate and/or resource block) value (or range).

Also, the proposed methods of the present disclosure may be applied limitedly only to the mode #3 (and/or mode #4) V2X subcarriers (and/or (mode #4 (or 3)) sidelink (or uplink) SPS (and/or sidelink (or uplink) dynamic scheduling) subcarriers).

Also, the proposed methods of the present disclosure may be applied (limitedly) only to the case where positions and/or the number of synchronization signal (TX (and/or RX)) resources (and/or positions and/or the number of V2X resource pool-related subframes (and/or sizes and/or the number of subchannels)) are the same (and/or (partially) different) among sub carriers.

Figure 11:
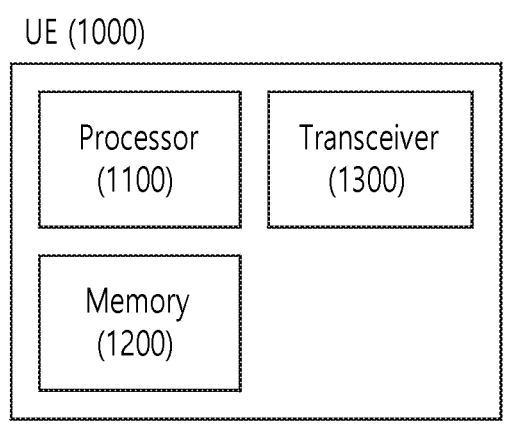
FIG. 11 is a block diagram illustrating an apparatus in which embodiments of the present disclosure are implemented.

FIG. 11 is a block diagram illustrating an apparatus in which embodiments of the present disclosure are implemented.

Referring to FIG. 11, the apparatus 1000 comprises a processor 1100, memory 1200, and transceiver 1300. The processor 1100 implements the proposed functions, processes and/or methods. The apparatus 1000 may be a UE or an eNB. The transceiver 1300, being connected to the processor 110, transmits and receives a wireless signal. The memory 1200 may store information needed for operation of the processor 1100 and store a transmission and reception signal.

Figure 12:
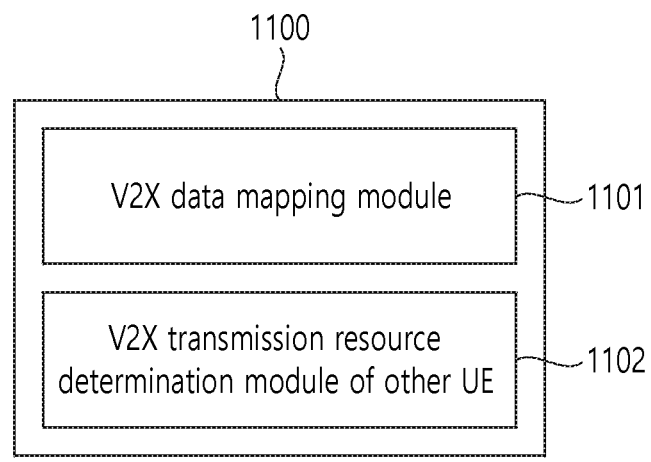
FIG. 12 illustrates one example of configuring a processor 1100.

FIG. 12 illustrates one example of configuring a processor 1100.

Referring to FIG. 12, the processor 1100 may include a V2X data mapping module 1101 and a V2X transmission resource determination module of other UE 1102.

The V2X transmission resource determination module of other UE 1102 may receive scheduling information transmitted by other UE through a PSCCH and determine the V2X transmission resources of the other UE. The V2X data mapping module 1101, being connected to the V2X transmission resource determination module 1102 of other UE, may perform rate matching after excluding an error symbol (ER_symbol) determined in consideration of the V2X transmission resources of the other UE from a data mapping step.

The processor may include an application-specific integrated circuit (ASIC), other chipsets, logic circuits and/or a data processing device. A memory may include a read-only memory (ROM), a random access memory (RAM), a flash memory, a memory card, a storage medium and/or other storage devices. An RF unit may include a baseband circuit for processing RF signals. When embodiments are implemented by software, the above-described methods may be implemented as modules (processes, functions, and the like) performing the above-described functions. Modules may be stored in the memory and executed by the processor. The memory may be provided inside or outside the processor and connected to the processor through various known means.

What is claimed is:

1. A method for a vehicle-to-everything (V2X) transmission in a wireless communication system, the method performed by a first user equipment (UE) and comprising:
   receiving, from a second UE, scheduling information, wherein the scheduling information is information for scheduling a short-transmission time interval (S-TTI) transmission on a second resource area;
   based on receiving the scheduling information from the second UE, performing rate matching on a first resource area for a legacy-TTI (L-TTI) transmission except for a specific symbol in the first resource area, wherein the first resource area is frequency division multiplexed from the second resource area, wherein the first resource area includes—N symbols in a time domain, wherein the N is a natural number; and
   performing the L-TTI transmission on the first resource area,
   wherein the second resource area includes M symbols in the time domain, wherein the M is a natural number smaller than the N,
   wherein the S-TTI transmission and the L-TTI transmission are the V2X transmission,
   wherein a starting point of the first resource area is the same as a starting point of the second resource area in the time domain,
   wherein the specific symbol in the first resource area is used for an automatic gain control (ACG) settling, and
   wherein the specific symbol is positioned immediately after M symbols in the first resource area.

2. The method of claim 1, wherein the first resource area includes 14 symbols, and the second resource area includes 7 symbols in the time domain.

3. A User Equipment (UE) configured for a vehicle-to-everything (V2X) transmission, the UE comprising:
   a transceiver configured to transmit and receive radio signals; and
   a processor,
   wherein the processor is configured to:
   control the transceiver to receive, from another UE, scheduling information, wherein the scheduling information is information for scheduling a short-transmission time interval (S-TTI) transmission on a second resource area;
   based on receiving the scheduling information from the another UE, perform rate matching on a first resource area for a legacy-TTI (L-TTI) transmission except for a specific symbol in the first resource area, wherein the first resource area is frequency division multiplexed from the second resource area, wherein the first resource area includes N symbols in a time domain, wherein the N is a natural number; and
   perform the L-TTI transmission on the first resource area,
   wherein the second resource area includes M symbols in the time domain, wherein the M is a natural number smaller than the N,
   wherein the S-TTI transmission and the L-TTI transmission are the V2X transmission,
   wherein a starting point of the first resource area is the same as a starting point of the second resource area in the time domain,
   wherein the specific symbol in the first resource area is used for an automatic gain control (ACG) settling, and wherein the specific symbol is positioned immediately after M symbols in the first resource area.

4. The UE of claim 3, wherein the first resource area includes 14 symbols, and the second resource area includes 7 symbols in the time domain.

\* \* \* \* \*